United States Patent [19]

Kellams et al.

[11] Patent Number: 5,854,749
[45] Date of Patent: Dec. 29, 1998

[54] CUSTOM QUALITY CONTROL MONITORING OF A STEEL MAKING PROCESS

[75] Inventors: James Kellams, Canton, Ohio; Luigi Morsut, Tapogliano; Giovanni Michelon, Groizia, both of Italy

[73] Assignee: Republic Engineered Steels, Inc., Massillon, Ohio

[21] Appl. No.: 679,100

[22] Filed: Jul. 12, 1996

(Under 37 CFR 1.47)

Related U.S. Application Data

[60] Provisional application No. 60/001,342 Jul. 19, 1995.

[51] Int. Cl.[6] ............................................. G06F 19/00
[52] U.S. Cl. .............. 364/472.02; 364/188; 364/468.17; 345/965; 164/452
[58] Field of Search ............... 364/472.02, 472.03, 364/468.16, 468.17, 552, 188, 189; 395/965, 969, 970, 613, 904, 912, 919, 922; 148/541; 164/4.1, 451, 452, 154.1, 155.1, 449.1, 413, 414; 266/80, 96; 707/102

[56] References Cited

U.S. PATENT DOCUMENTS

| | | | |
|---|---|---|---|
| 4,131,490 | 12/1978 | Oishi et al. | 266/51 X |
| 4,519,041 | 5/1985 | Fant et al. | 364/552 |
| 4,908,746 | 3/1990 | Vaughn | 364/147 |
| 5,325,522 | 6/1994 | Vaughn | 395/600 |
| 5,440,478 | 8/1995 | Fisher et al. | 364/468.16 |
| 5,461,570 | 10/1995 | Wang et al. | 364/468.17 |
| 5,596,704 | 1/1997 | Geddes et al. | 395/970 X |
| 5,611,059 | 3/1997 | Benton et al. | 395/965 X |

OTHER PUBLICATIONS

*The Making, Shaping and Treating of Steel*, United States Steel, Edited by Harold E. McGannon, Herbick & Held, Pittsburgh, PA, pp. 706–714 (9th Ed., 1971).

Krebs, H.G., et al., "Progress in Automation of Continuous Casting Machines," Voest–Alpine AG, Continuous Casting Conference, Paper No. 22, 9 pages (1987).

*Primary Examiner*—Joseph Ruggiero
*Attorney, Agent, or Firm*—Watts, Hoffmann, Fisher & Heinke, Co., L.P.A.

[57] ABSTRACT

A system for monitoring a continuous steel casting process wherein one or more strands of steel are cast from a mold, allowed to cool and then cut into blooms. A plurality of sensors monitor process parameters at different locations relative to a strand of steel as the strand exits the mold, cools and is cut. A storage device stores data representations of the parameters as they are monitored by the plurality of sensors. A data network communicates data from the plurality of sensors to the storage device. A logic processor coupled to the storage device prompts an operator as the operator sets up logic relations between parameters of the steel casting process that identify and categorize defects in steel. The logic processor includes a mathematical parser for evaluating the logic relations between parameters and converting the logic relations to processor instructions used to evaluate the data representations of the parameters for defects.

18 Claims, 12 Drawing Sheets

Visual Defect Edit

219

| Operator | : | | |
|---|---|---|---|
| Revision | : | | |
| QCS code | : | POWDER_ON_STEEL | |
| Area id. | : | 30 | CCM →| |
| Description | : | | |
| Influence pos. [in] | : | 0.0 | |
| Influence neg. [in] | : | 0.0 | |
| Main Defect | : | SC →| | |
| Defect Level | : | 1 | (0=Prime 1=Salvage 2=Scrap) |
| Defects : | | | |

[HELP]  [SAVE]  [EXIT]

*(Figure shows a screen display labeled "QCS VARIABLES" with columns AREA ID, VARIABLE ID, VARIABLE NAME, Last Revision, and a "QCS Variable Edit" dialog box with fields: Operator SYSTEM, Revision, AREA ID/NAME 30 CCM, Variable Code 101, Variable Name CAST_SPEED, and buttons HELP, SAVE, EXIT. Outer buttons: HELP, INSERT..., DELETE, PRINT, EXIT. Labels 217, 218a, 218b. Date 05-18-95 11:13, Last Revision 05-18-1995 11:04, AREA ID 30, VARIABLE ID 100, VARIABLE NAME MOLD LEVEL, Record 1 of 1, message_line.)*

CUSTOM QUALITY CONTROL MONITORING OF A STEEL MAKING PROCESS

RELATED APPLICATION

The present application claims the benefit of prior U.S. provisional application Ser. No. 60/001,342, filed Jul. 19, 1995.

FIELD OF THE INVENTION

The present invention relates to monitoring of a continuous caster for making steel billets and more specifically to the custom monitoring of defects that may be created during the casting of steel for such billets.

BACKGROUND ART

Continuous casting of steel is a known process for producing elongated steel slabs known as blooms. Molten steel is poured through a mold that cools the steel and produces a continuous solid steel strand. The solid steel strand that exits the mold is cut into a number of elongated steel blooms that are shaped by rolling to form billets. Many process variables are monitored during the casting and forming processes to assure the quality of the steel that is produced meets customer specifications.

The steel billets are oblong shaped lengths of steel several inches wide and many feet long. The elongated steel billets can be reheated by the steel manufacturer and rolled into steel bars or the steel billet can be shipped to the customer for customer fabrication of the steel end product. Motor vehicle axles are one example of a product made from steel bars that are formed from billets.

Blooms can be cast from scrap steel that is melted in an electric arc furnace and moved to the caster in a ladle. The molten steel for the caster can also be recently made steel that is moved from a basic oxygen furnace to the caster in a ladle. The molten steel in the ladle is referred to as a heat and can weigh hundreds of tons.

The molten steel is poured from the ladle into a tundish which acts as a manifold for delivering the molten steel into individual molds located beneath the tundish. These molds are open at the top and include a water cooled casing that rapidly cools the steel flowing into the mold from the tundish. As the molten steel cools a solid skin forms that exits the mold in the form of a strand of very hot steel. Water is sprayed onto the solid outer skin of the strand after it exits the molds. The strand interior solidifies as heat is transferred away from the strand by the water contacting the strand's outer surface.

The strand of steel bends along an arcuate path defined by guide rollers positioned along a travel path beneath the mold. A typical continuous caster has multiple side by side molds receiving molten steel from a single tundish. Multiple strands of steel move in parallel away from the molds, bend away from a vertical through an arcuate path, and then are moved horizontally away from the vicinity of the molds by drive rollers. The horizontally moving strands are still hot but are solid throughout their cross section.

Each of the parallel moving strands is cut into steel sections called blooms. The blooms are later rolled to shape them into smaller cross section billets and cut to specified lengths. The billets are further rolled, either by the customer or the steel manufacturer to form bars. The shape and quality of the bars are dictated by the customer which in turn dictate manufacturing criteria as the steel is cast and cut into blooms at the casting site.

As blooms are cut from strands each bloom is assigned a bloom identifier that includes the heat number, the strand number and a bloom number within that strand. This bloom identifier is stored in a computer database along with specified manufacturing data associated with that bloom such as the bloom dimension, customer order number, date of production etc.

As the strands are being cast a number of manufacturing parameters are monitored. Occasionally these parameters fall outside tolerances and defects in the steel result. Use of the present invention allows operators familiar with the steel casting process to add a production data base that is updated as the steel is produced.

Storing and categorizing quality control data requires the gathering of manufacturing parameters as the steel is cast. U.S. Pat. No. 5,325,522 to Vaughn entitled "Apparatus and Method for Communicating Between Devices through use of a Real Time Data Base" describes a control system that manages a transfer of electronic signals to and from industrial and scientific equipment. A real time database stores data elements which may be accessed by a plurality of so called tasks. Each data element in the database has a changed status flag which indicates whether the value of the data element has changed. The subject matter of U.S. Pat. No. 5,325,522 is incorporated herein by reference.

The system disclosed in the '522 patent implements tasks that are programmed to perform a function that depends on data in the real time database. This programming is done with the system off line and requires a systems programmer familiar with both the task to be performed and a programming language for implementing that task with the computer hardware of the system.

DISCLOSURE OF THE INVENTION

The present invention concerns a customizable quality control system that allows an operator familiar with the steel making process to adjust the way the quality control system functions. An operator with no computer programming experience can change monitoring system responses to gathered data. Prompts on an operator console guide the operator through the steps needed to update the quality control data that is stored for each steel bloom.

The invention can most preferably be used for real time monitoring of the production of steel wherein one or more steel strands are continuously cast by pouring molten steel through a mold. Either before or during the steel making process the operator can access a user interface that prompts the operator to perform steps needed to create one or more logical relationships between steel making process variables. These process variables are monitored in real time as strands of steel are cast. The variables used to define the logical relation are sensed periodically and updated in a database. A computer determines whether any of the one or more logical relationships created by the operator has been satisfied based upon updated data in the database. If any of the one or more logical relationships created by the operator is satisfied, data is assigned to a data storage for a segment of steel that is then being cast.

The invention is typically used to set up defect variables and to relate those variables to sensed parameters of the casting process. If a logical relationship is found to be true, a flag is set and a record added to the database for the bloom in which the defect occurs.

BEST MODE FOR PRACTICING THE INVENTION

Figure 1:
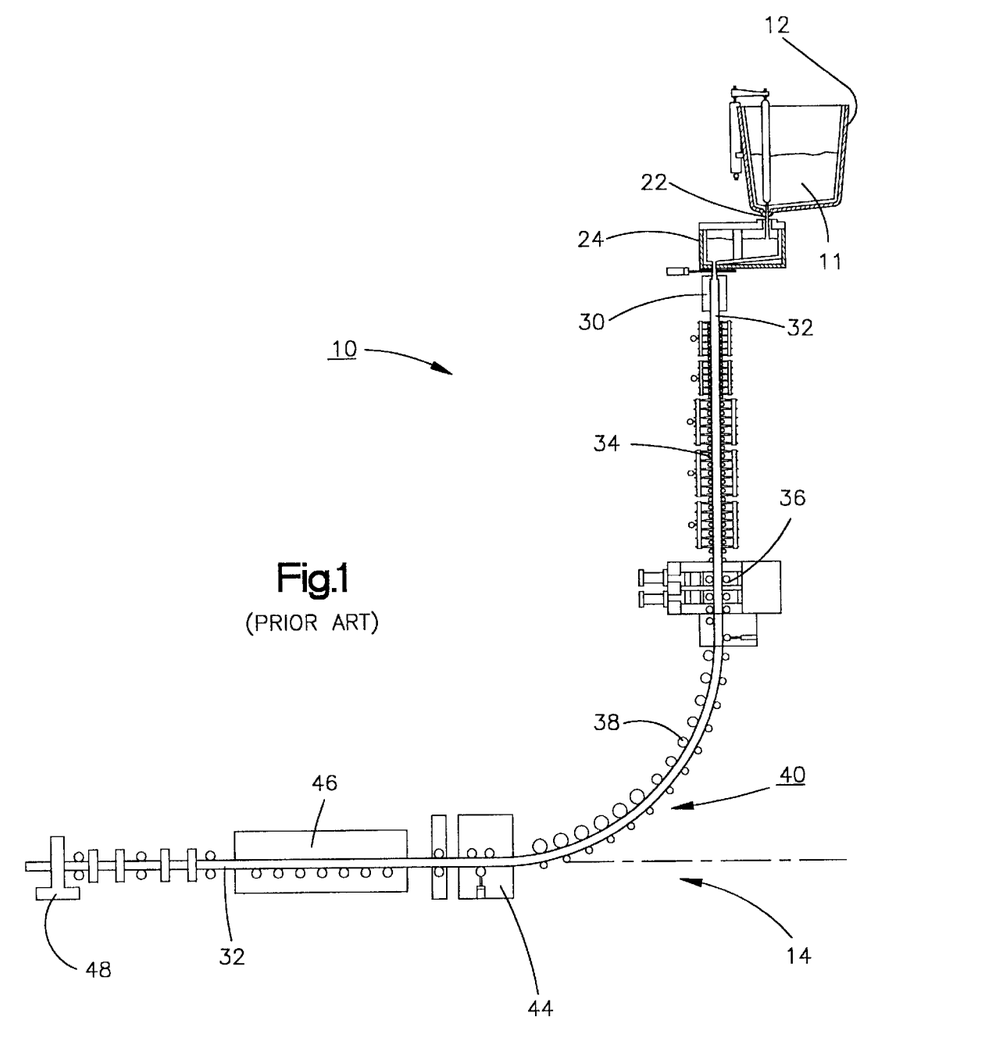
FIG. 1 is a schematic view of a continuous caster for casting steel blooms from molten steel poured through a casting mold.

Turning now to the drawings, FIG. 1 is a depiction of a typical prior art continuous caster 10 for making steel billets. An arc furnace (not shown) heats scrap steel to a molten state and the steel is transferred in a ladle 12 from the vicinity of the arc furnace to the continuous caster 10.

The ladle 12 is brought into the caster 10 at the ground floor level 14. Before it is cast into blooms, the steel is modified with additives that define the properties of the steel. The steel is also vacuum treated to outgas impurities. The results of treatment with additives and outgassing of impurities are monitored by metallurgists that sample the finished steel and adjust the molten steel makeup based upon customer requirements.

The ladle 12 is raised to a casting floor by a crane that can lift the combined weight of the molten steel 11 and the ladle 12 (about 300 tons). At the level of the casting floor the ladle is placed on a car that moves the ladle to a casting position. The ladle 12 has a spout 22 that allows the molton metal 11 to pour from the ladle 12 at a controlled rate into a tundish 24.

The tundish 24 acts as a manifold for routing molten steel through multiple openings to a plurality of molds. In the FIG. 1 depiction of the caster 10 only a single mold 30 is shown, but in a preferred caster there are four molds that simultaneously receive molten steel. Initially, as molten steel flows into the tundish, gates that open into the molds are closed so that the level of steel in the tundish rises. Once the molten steel reaches an appropriate level, the gates are opened and the molten steel flows from the tundish to the molds.

Each mold includes a water jacket that cools the molten steel as it enters the mold 30. The mold also includes an exit opening of a dimension such that steel flows from the mold in a strand 32 that has begun to solidify on an outer surface. As the strand falls away from the mold, cooling water is sprayed onto the outer surface of the strand by nozzles 34. This causes further cooling of the strand so that the steel solidifies more rapidly as it leaves the mold.

Pinch rollers 36 beneath the region of the water spray compress the steel. In the region of the pinch rollers 36 the interior of the strand is still molten and the pinch rollers squeeze the steel at this point to remove voids which could degrade the quality of the steel. The pinch rollers 36 are followed by other rollers 38 that guide the strand in an arcuate path 40 in a 90 degree arc to a travel path 42 at a ground floor level 14 of the caster 10.

After reaching the ground floor level 14 vertical and horizontal rollers in a slab straightener 44 straighten the strand 32. The strand is heated to a uniform temperature in a re-heat furnace 46 and then cut at a torch cut off station 48 into bloom length pieces that are stored for subsequent rolling and cutting into billets of a desired shape. One factor in cutting the blooms is customer specifications concerning billet size since this dictates the length of each bloom as it is cut from the continuous steel strand 32. Additional information concerning a prior art continuous caster is found in the publication entitled "The Making, Shaping and Treating of Steel" by McGannon, copyright 1971 U.S. Steel Corporation.

Data monitoring

Many physical parameters are continuously monitored and transferred to a database of records that characterize the steel as it is being cast. Data is gathered, transferred, evaluated and stored by means of a local area network 100 (FIG. 2) that is connected through multiple PLC (programmable logic controller) interfaces 102 with sensors 103 for sensing physical parameters and placing the data from the sensors 103 on the network 100.

Figure 2:
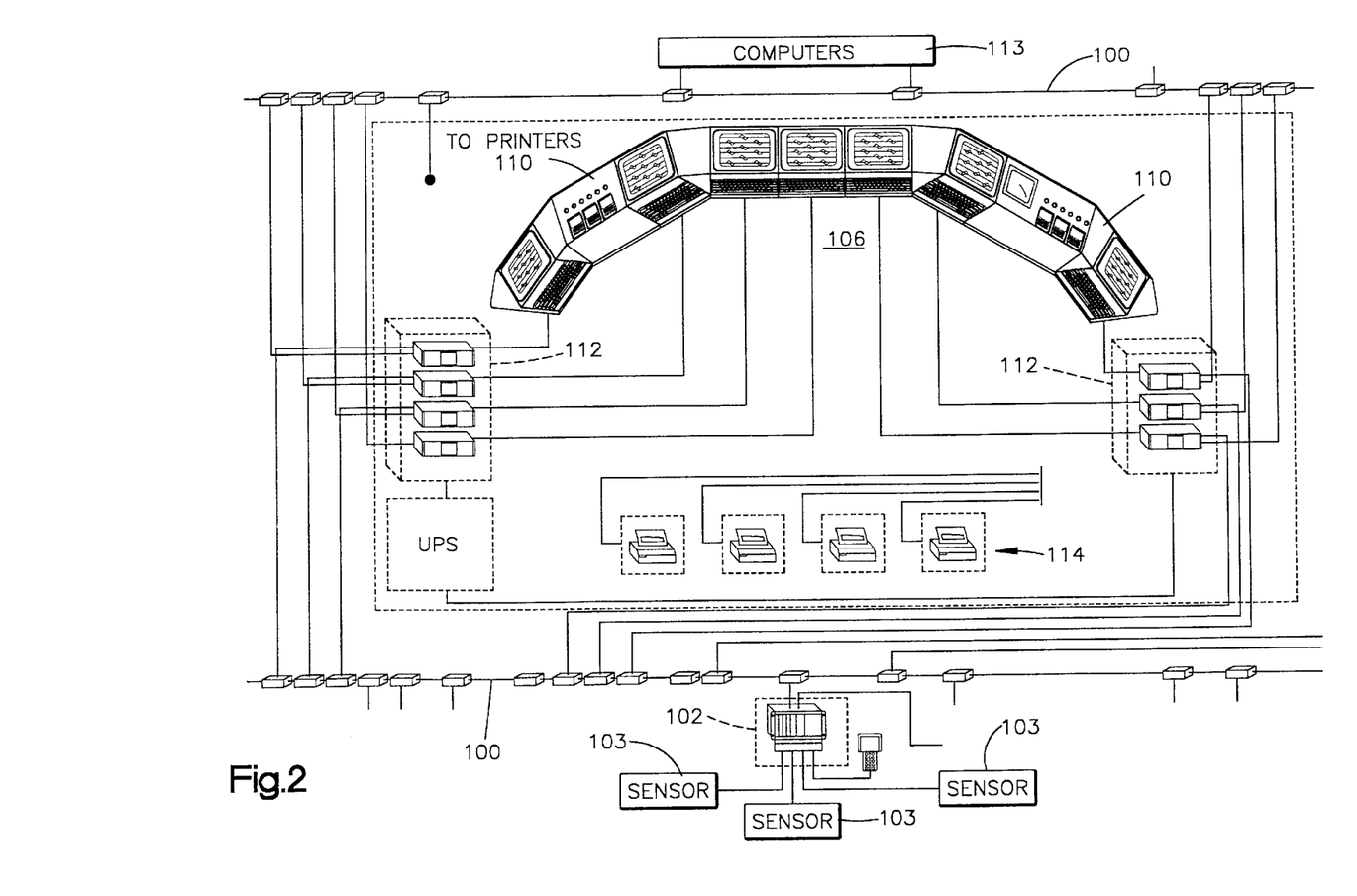
FIG. 2 is a schematic indicating data flow from sensors for monitoring casting parameters and a control pulpit from which the casting process is controlled.

The entire casting operation can be monitoring by operators at a command pulpit 106 that includes a number of computer consoles 110, coupled to computers 112. Other computers 113 located in a separate computer room (not shown) are also coupled to the network 100. Hard copy output of data stored on the computers can be provided by printers 114 in the region of the command pulpit 106. As casting occurs, four strands of hot steel are emitted from the molds on the level of the casting floor. The four strands pass in front of the command pulpit 106 and are cut into blooms by four steel cutters located at a strand cutting station.

Various parameters of the steel casting process are monitored in real time and transmitted by the local area network 100. Software executing in the computers 112 identify and classify defects in the steel by means of logical SQL comparisons set up by operators familiar with the steel casting process. Operators at the command pulpit or at other computers tied to the command pulpit by the local area network 100 can change the way the software handles the real time parameters.

An operator at the console creates or modifies one or more logical relationships between one or more process variables that are monitored in real time as strands of steel are cast. As the one or more process variables are updated in a realtime database of the process variables, the logical relationships are periodically checked to determine whether any of the one or more logical relationships has been satisfied. If any of the one or more logical relationships created by the operator is satisfied, data in a production database is modified to describe a segment of steel that is being cast.

The software executing on the computers 112 includes a mathematical expression processor which reads dynamically updated variables from the realtime data base and executes one or more operator entered mathematical expressions. The results of this evaluation is a true or false output. Since one of the principle uses of the system is in identifying defects, evaluation of an expression as true most typically causes a defect flag to be set. Once the defect flag is set, a second evaluation determines the location, severity and influence range of the identified defect.

To further describe the process of updating, evaluating and storing data, a specific example relating to casting of steel by the continuous caster 10 is described. Research has determined that an absolute deviation in molten steel level in the molds 30 of 10 millimeters over one second may create an inclusion at the steel meniscus within the mold. To configure the Quality Control software to detect this condition, the system operator sets up a relationship that detects such a condition.

A console 110 presents a number of options that can be chosen to affect the casting quality monitoring system. The operator defines a variable name which corresponds to a true condition, assigns a severity level, and enters appropriate location and influence information. As an example:

| Name: | ABS_MOLDLEVEL_CHG |
|---|---|
| Level: | 1 (most severe defect level) |
| Location: | 0 inches (at the meniscus) |
| Positive Influence: | 5 inches (above location) |
| Negative Influence: | 5 inches (below location) |

When this information is entered at the command pulpit console 110, a new defect type has been described which has a severity level of one. If the flag is set at any time, the defect will likely appear in a bloom slice currently at the top of the mold level, and the region five inches above and five inches below this location will be identified as having the same defect.

Once a new defect type is described with the above entries, the operator establishes a relationship between existing data that is monitored in real time and assigns this relationship to the variable, in this case ABS MOLDLEVELCHG. As an example:

$$\text{ABSMOLDLEVELCHG} = (\text{ABS}(\text{MLevelT0} - \text{MLevelT1}) >= 10) \quad \text{(eq 1)}$$

where MLevelT0 is the current mold level, and
where MLevelT1 is the mold level one second earlier The relation defined by equation 1 is entered by a user as an algebraic expression. The relation may be changed at any time by the operator. To do so the operator merely accesses a screen (FIG. 3C) that defines the logical relation for the ABSMOLDLEVELCHG variable and enters appropriate changes in a string that defines the equation 1 relation.

Each operator defined expression is passed to a mathematical relation parser that interprets the expression and clears or sets a boolean variable. If the boolean variable is true, the processor executing the monitoring system applications program calls embedded SQL functions that implement the operator defined instructions relative to areas of influence etc.

The specific instruction of equation 1 causes the software to extract the relevant dynamic variables (MLevelT0 and MLevelT1) from the realtime database where they are stored. If the absolute value of the difference in these two variables is greater than 10 (mm) the ABSMOLDLEVEL CHG boolean variable is set. When this flag is set another SQL instruction is called causing a record to be written to a production database. This apprises other system software and personnel monitoring defects that a particular bloom has a defect in a particular location and having influence regions described above. Thus, the defect becomes a part of the data record for a particular bloom and this data can be looked up as easily as the length or customer id of that bloom.

The dynamic variables (such as MLevelT0) that are monitored by the sensors 103 and stored in realtime database records maintained by FactoryLink software commercially available from U.S. Data Corporation. There are presently over one hundred dynamic variables that are monitored. Once established, these variables cannot be changed by the operators in the pulpit. System programmer intervention is required for these variables to be supplemented or deleted. While there is no theoretical limit on the number of defect variables and relationships that can be defined there are practical limitations imposed by the system resources and reasonable performance considerations. Thus, if reasonable response times are required in identifying defects and adding data concerning those defects to the database, then the number of defect variables must be limited.

Software organization

Figure 4:
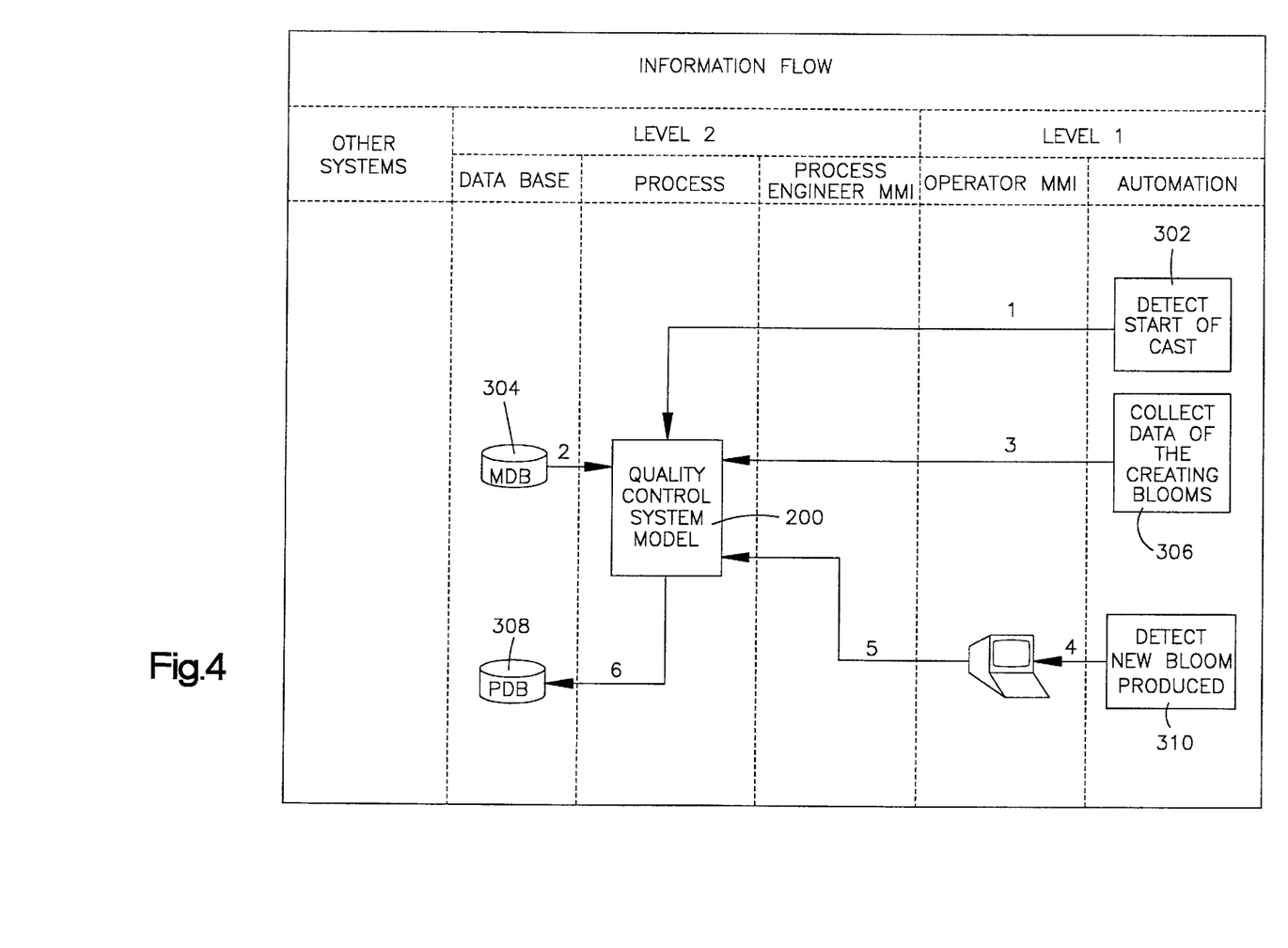
FIG. 4 is a block diagram showing an interrelationship between an applications computer program for monitoring steel making parameters and assigning logical relations between those steel making parameters and database files for storing bloom information.

The system described above is implemented using different pieces of commercial software that facilitate the building of the preferred quality monitoring application program. The inputs to the source quality program 200 are illustrated in FIG. 4.

An operating system having multitasking capability such as windows NT or Unix calls the monitoring program 200 at system startup and this monitoring program executes as one task on the multitasking operating system. The monitoring program executes on one or more of the computers 110 coupled to the communications network 100. The monitoring system application program 200 implements a user interface and responds to user inputs at that interface to direct a manner in which the monitoring program assesses the casting process.

The monitoring system application program 200 also allows the operator to set up and update database tables for variables that describe the blooms as they are produced. Network operating system processes also perform data acquisition and transfer of data on the communications network 100 as well as calling database management software.

The monitoring system application program 200 is programmed at the systems programming level using multiple tools. These tools access various runtime libraries that are compiled to object code and linked together to form an executable monitoring system application program.

Figure 5:
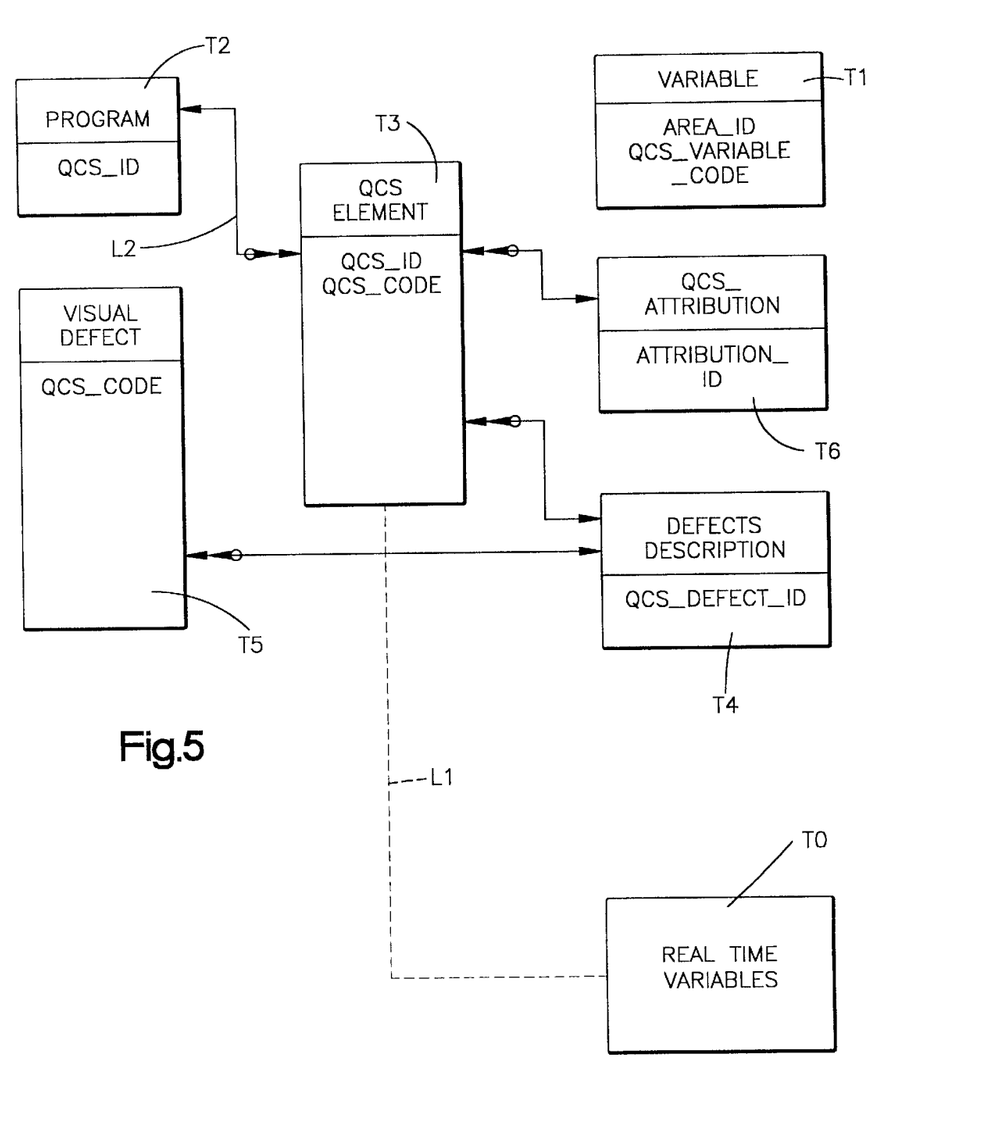
FIG. 5 is a data diagram showing components of a database management system used in implementing a preferred embodiment of the invention.

One tool available to the programmer is an Oracle database engine commercially available from Oracle corporation. This database program is a separate application program that can be used independently of the monitoring system application program. A second tool that stores realtime data that can be accessed by the monitoring system application program 200 is the FactoryLink software that maintains a real time database table T0 (FIG. 5).

A third tool is a graphical interface builder from Jaycc corporation called JAM that allows a windows based graphical user interfaces shown in FIGS. 3A–3H to be designed by moving icons on a screen. The JAM software also allows source code statements to be coded by the system programmer for responding to events such as activating a button on the graphical interface.

The JAM source code supports function calls to embedded SQL statements allowing access to the Oracle database application software. In addition to supporting the SQL calls, the JAM source code can call separately compiled object code routines such as routines programmed separately in "C" or other high level programming languages. The system programmer can first write code in another high level language and call those routines from the JAM source code. Additionally the JAM language supports data structures and procedures in a manner similar to other high level programming languages. One portion of the monitoring program that is separately coded is the mathematical language parser that periodically checks defect parameters such as the absolute mold level change variable described above.

User Interfaces

FIGS. 3A–3H illustrate a series of graphical user interface screens designed using the JAM software that allows the steel casting operator at the control pulpit 106 to adjust the production database.

Figure 3A:
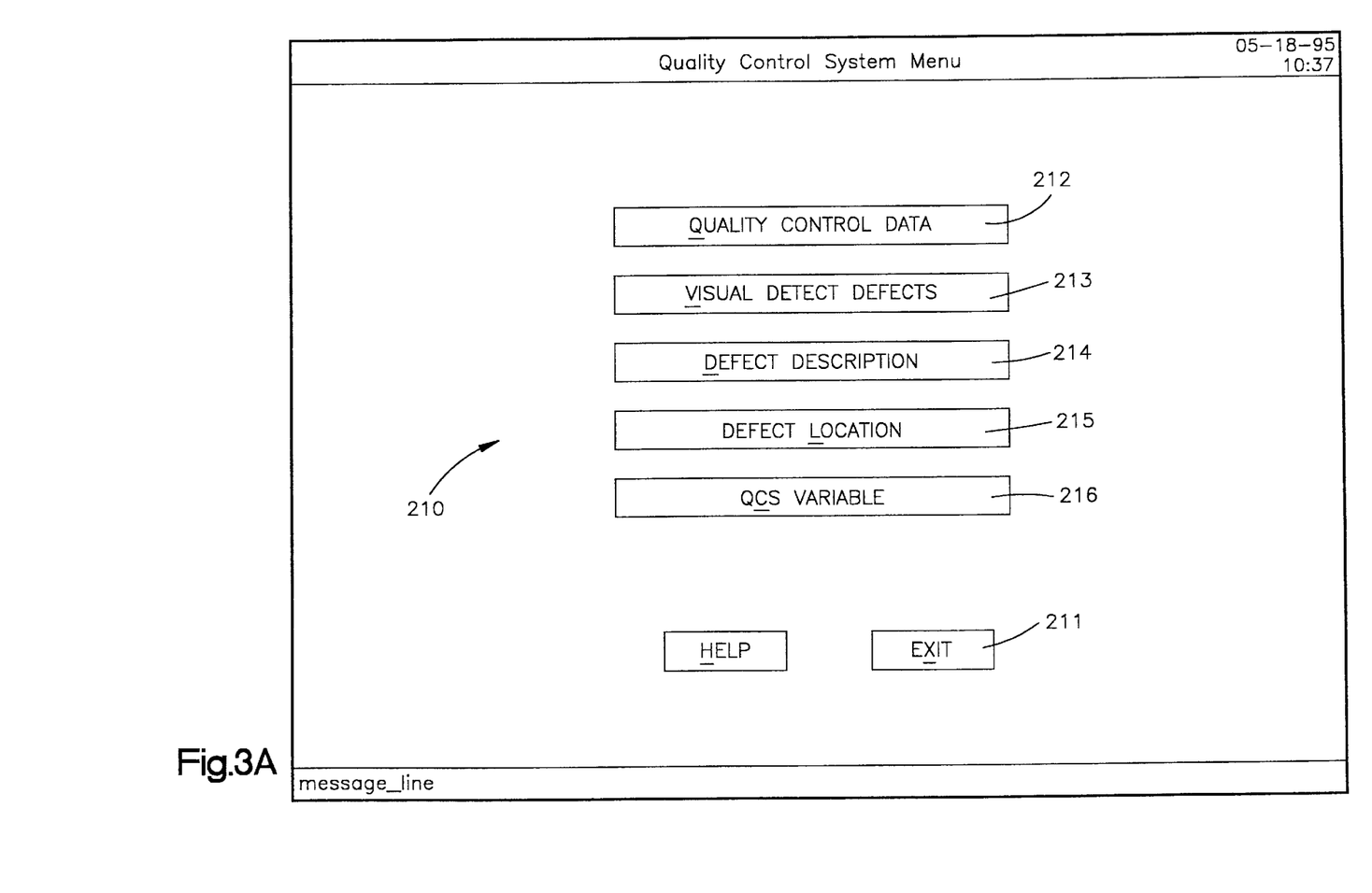
FIGS. 3A–3H show user interface screens on a console that allows an operator to set up quality control data tracking of the steel cast from the caster.

A first screen 210 shown in FIG. 3A is a quality control system menu screen that opens in response to a menu command on the console's main menu (not shown). Six options are available from the screen 210. By clicking the 'exit' option 211 with a mouse or keystroke entry the operator returns to the main console screen. The other five options 212–216 open other screens that are described below.

Referring now to FIG. 5, one sees an organization 300 of the database tables that are accessed by the monitoring systems applications program 200. Various tables T0–T6 of data are maintained by the FactoryLink and the Oracle software. As mentioned previously, the FactoryLink software monitors realtime sensed data and updates a first database table T0 of such data. The monitoring systems application program 200 database management system also maintains a link L1 between this table T1 and a second table T3 where the operator defines the logical relations between realtime variables.

To those familiar with database management theory, it will be appreciated that the primary data structure of the Oracle database is a number of tables that organize the make up of data tuples or records having multiple fields. Each table has a structure that includes one or more key fields. These key fields are listed for the six tables T1–T6 depicted in FIG. 5.

Choice of the option 216 shown in FIG. 3A opens a full screen QCS variable management window 217 (FIG. 3H) that allows the operator to view a listing of variable names 218a and variable identifiers 218b. The window 217 allows the operator to assign a name and location (AreaID) to the realtime variable acquired by FactorLink In the present application all the variables listed in the window 217 are from the same area (the continuous caster) and hence have the same AreaId designator. The identifier listing 218b is an offset into an array of the realtime variables. This array is fixed by the system programmer, but through the interface window 217 the operator can assign any descriptive "variable name" he or she chooses to the variable ID. These relations are saved in a non-key field designated as "QCS VariablesName" (Not shown) in the Table T1 of FIG. 5.

There are two type of defects that are tracked by the monitoring system. Automatically detected defects are based upon FactoryLink monitored data and the logical relationships set up by the operator. A second type of defect is a visually detected defect that has no logical relationship to the sensed data since it is an operator observed event. Two examples of such a defect would occur when a shroud is broken or when the ladle is plugged and needs to be lanced open. These events are recorded in a production database by the operator when the defect is observed. Choice of the option 213 in FIG. 3A allows the operator to define such visual defects. A window 219 in FIG. 3E allows a Table T5 to be updated to correlate a visual defect QCSCODE (key field) to be entered and associated with one or more defects maintained in a table T4.

Figure 3B:
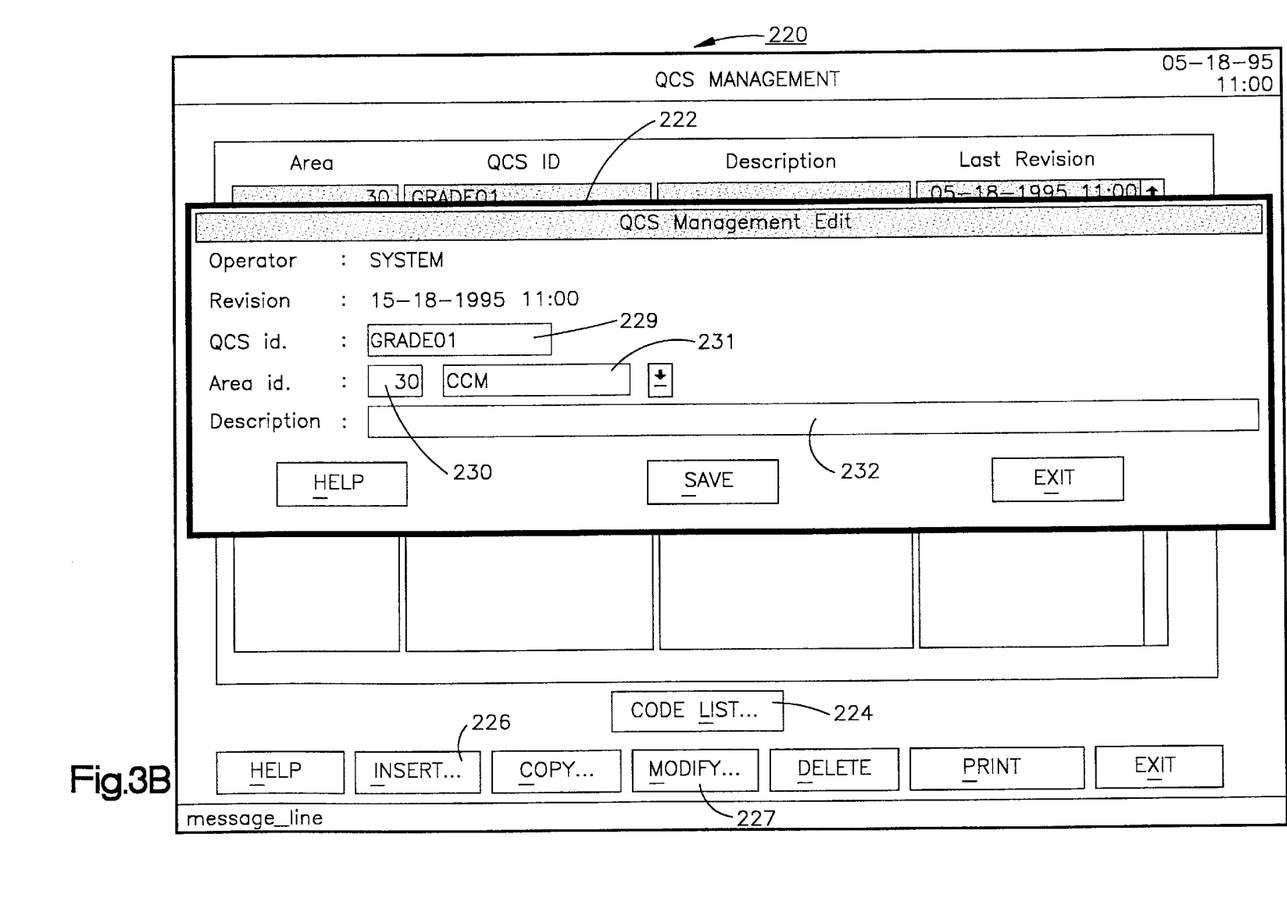
Figure 3C:
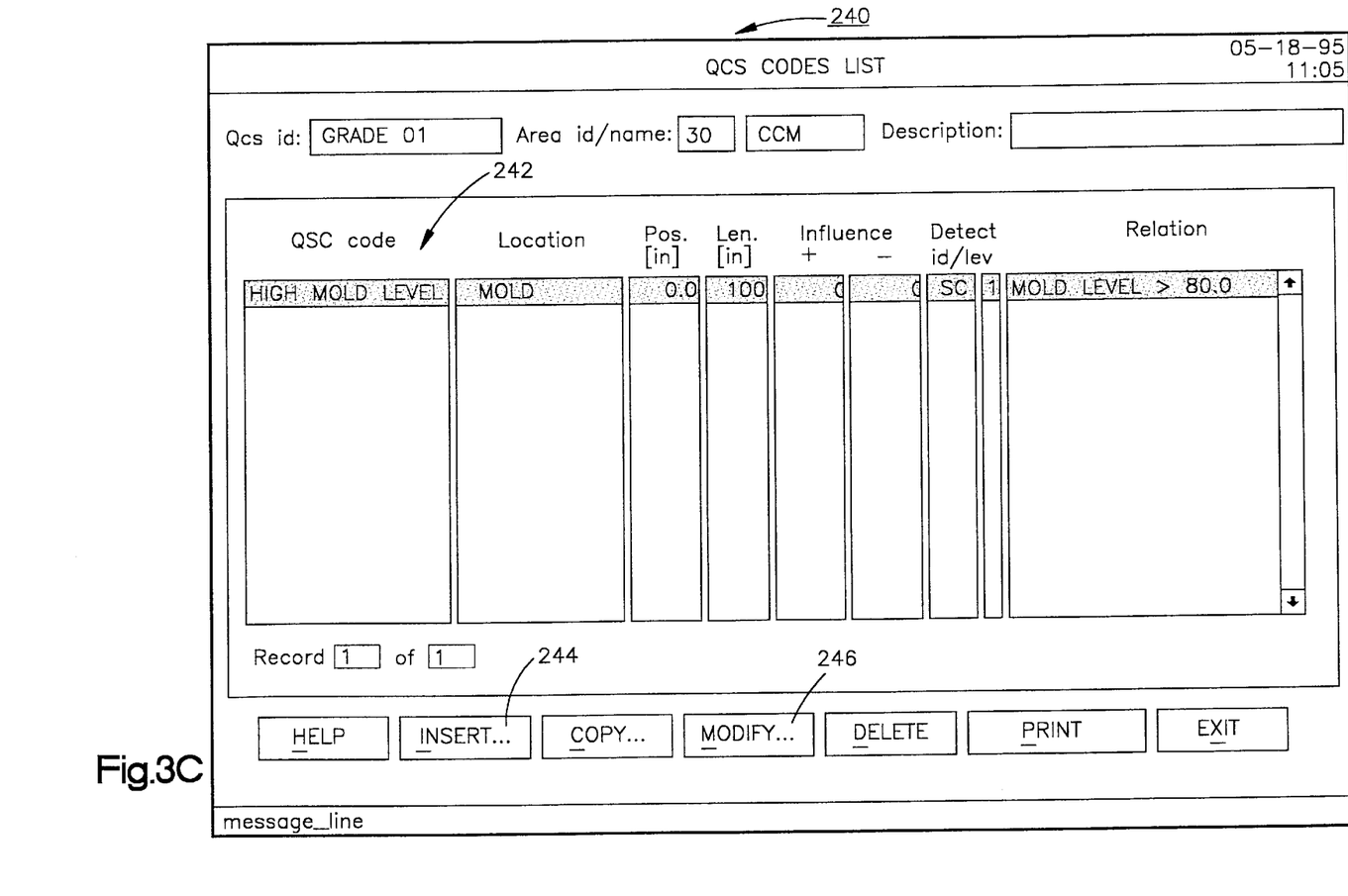

Choice of the option 212 in FIG. 3A opens a quality control system management screen 220 shown in FIG. 3B. A column 222 on this screen 220 contains a listing of quality system identifiers (QCSIds) that form a primary key into a database table T2 (FIG. 5) used in defining a group of QCS events. Activating a code list button 224 at the bottom of the screen 220 opens a full screen window 240 (FIG. 3C) that displays a listing of quality control system codes (QCS Code) linked by a one to many link L2 to the quality control system identifiers (QCSIds) 222 depicted in FIG. 3B. By linking the control system identifiers the operator determines which relations should be examined when casting a particular grade or using a particular practice listed in the table T2.

Choosing an Insert button 226 lists variables in a column 222 to be supplemented. A window 228 (FIG. 3B) opens on the screen 220 that allows strings to be inserted into edit boxes. One edit box 229 allows the operator to add a quality code source identifier to the listing 222 and other edit boxes 230–232 allow a description and area identifier to be added for a particular variable. Presently, all identifiers have a code of 30 to identify the continuous caster 10. The Modify button 227 at the bottom of the window 220 also opens the window 228 for an already existing variable to allow that variable to be modified.

When a heat starts, the QCS applications program 200 obtains the applicable relations from the Oracle database. Every six seconds, the application realtime variables are acquired from the realtime database and the relations are analyzed. As a bloom progresses from the mold to the cutting station, defect flags can be set and saved in memory. If the memory fills up, the data is written to a temporary file to free more memory for other defect information.

Turning to FIG. 3C, one sees a window 240 that opens in response to the button 224. This window defines the so-called QSC codes (QSCCode) in a column listing 242 that form a primary keys into the table T3. Typically the column listing 242 will have a number of codes that form a code list associated with a particular QCS identifier (QCS Id) in the table T2. An Insert button 244 at the bottom of the window 240 allows the operator to insert new codes for a given QCS identifier. A Modify button 246 allows the operator to modify codes already contained on the listing 242.

Figure 3D:
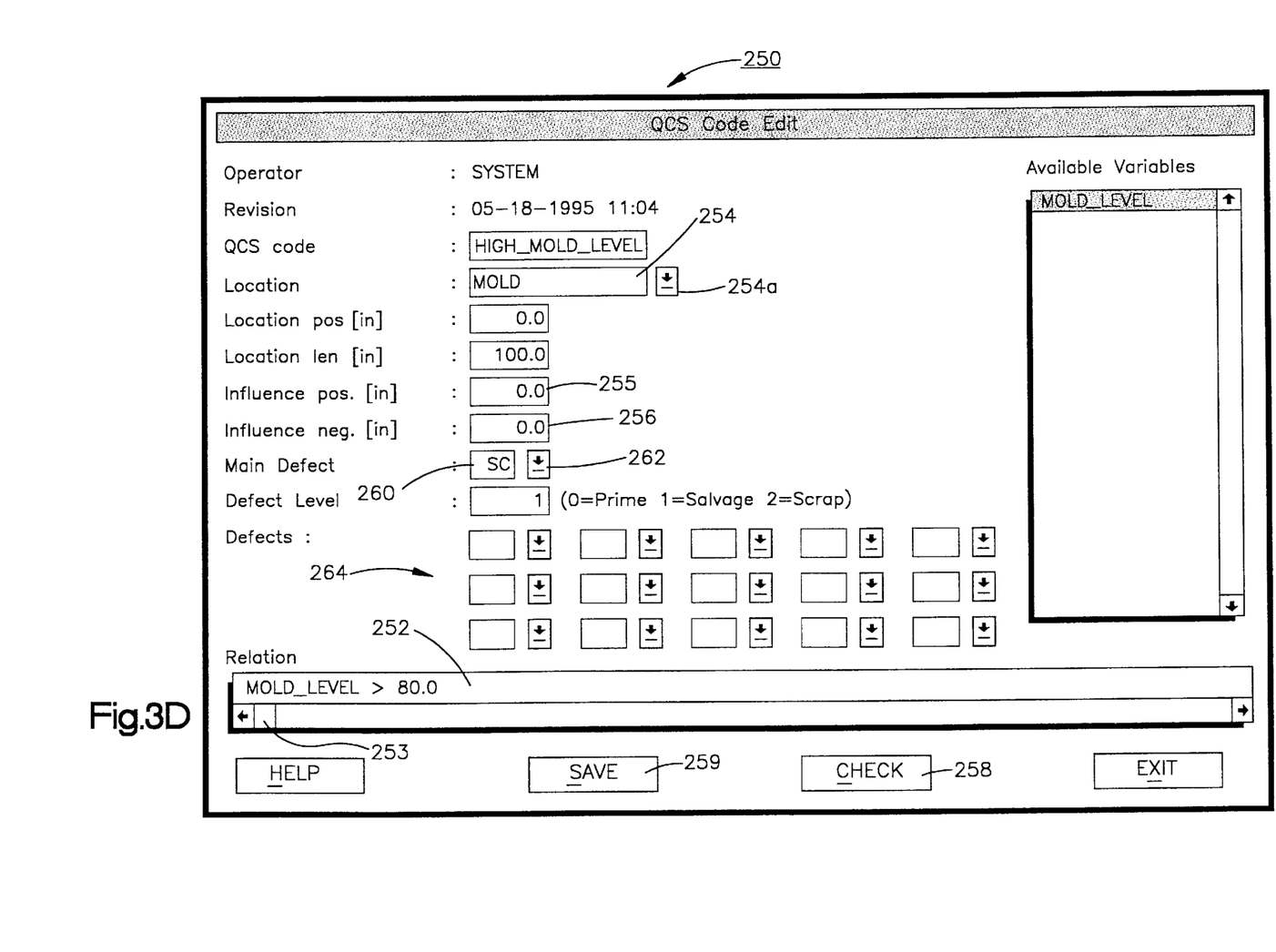
Figure 3E:
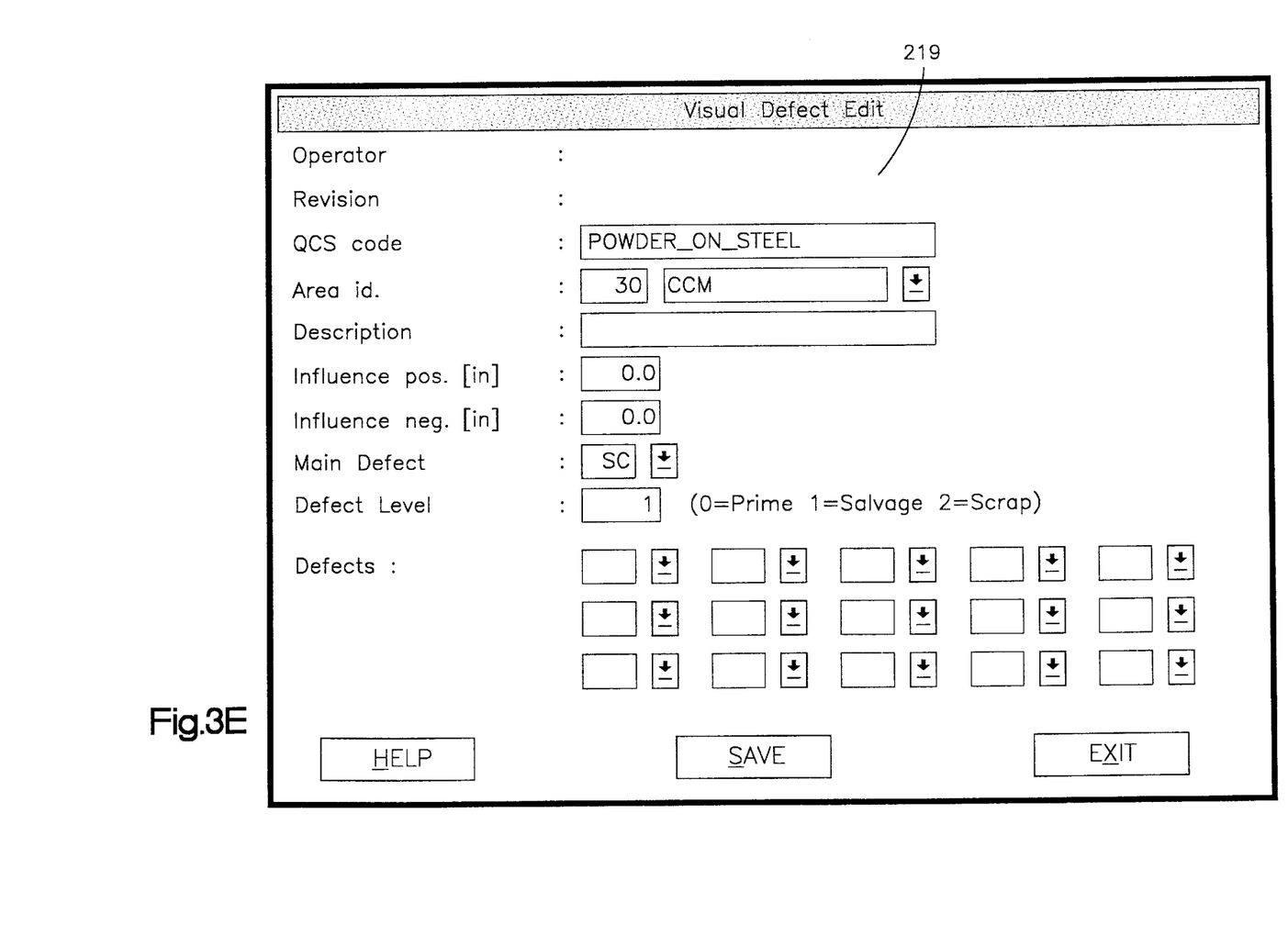
Figure 3F:
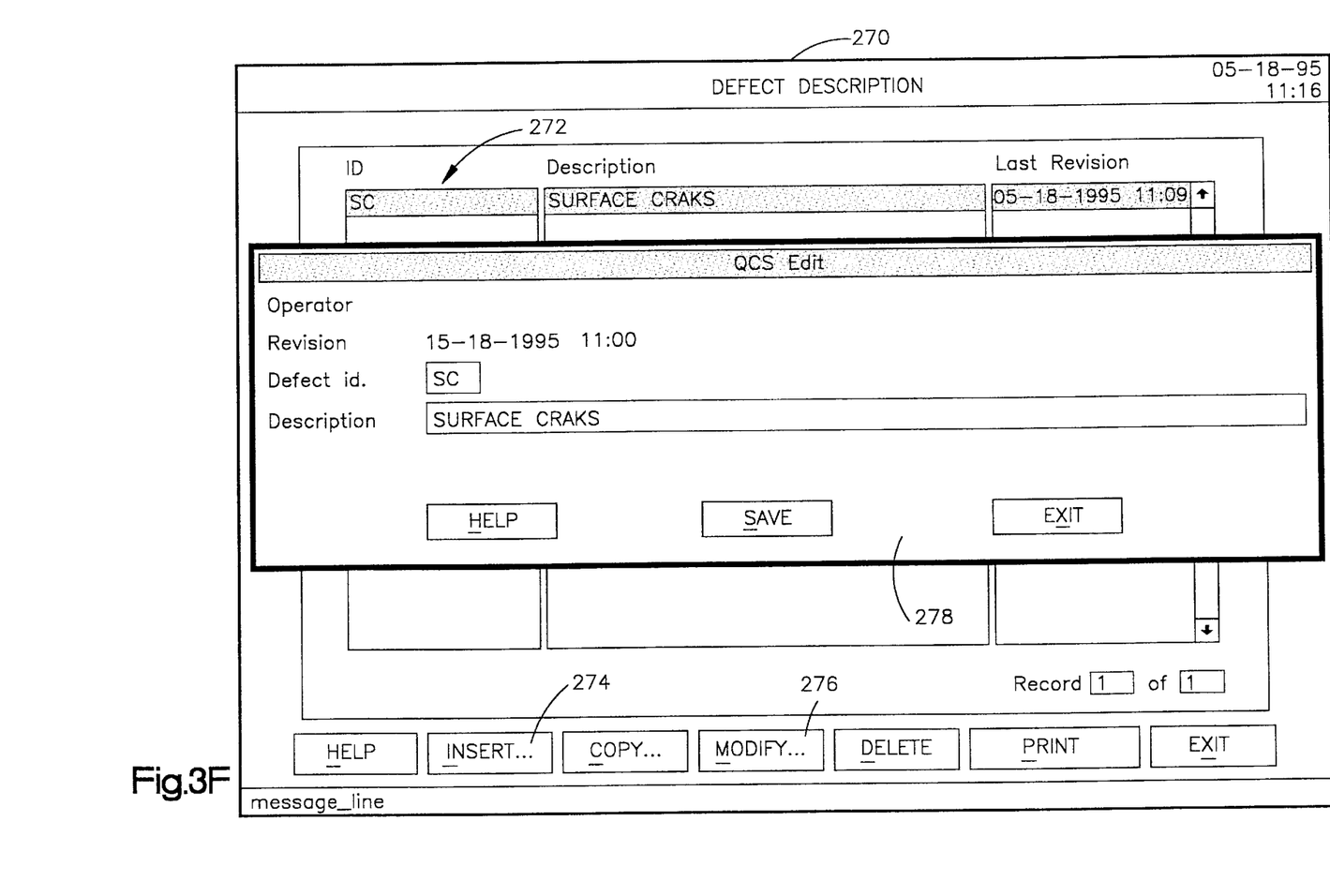
Figure 3G:
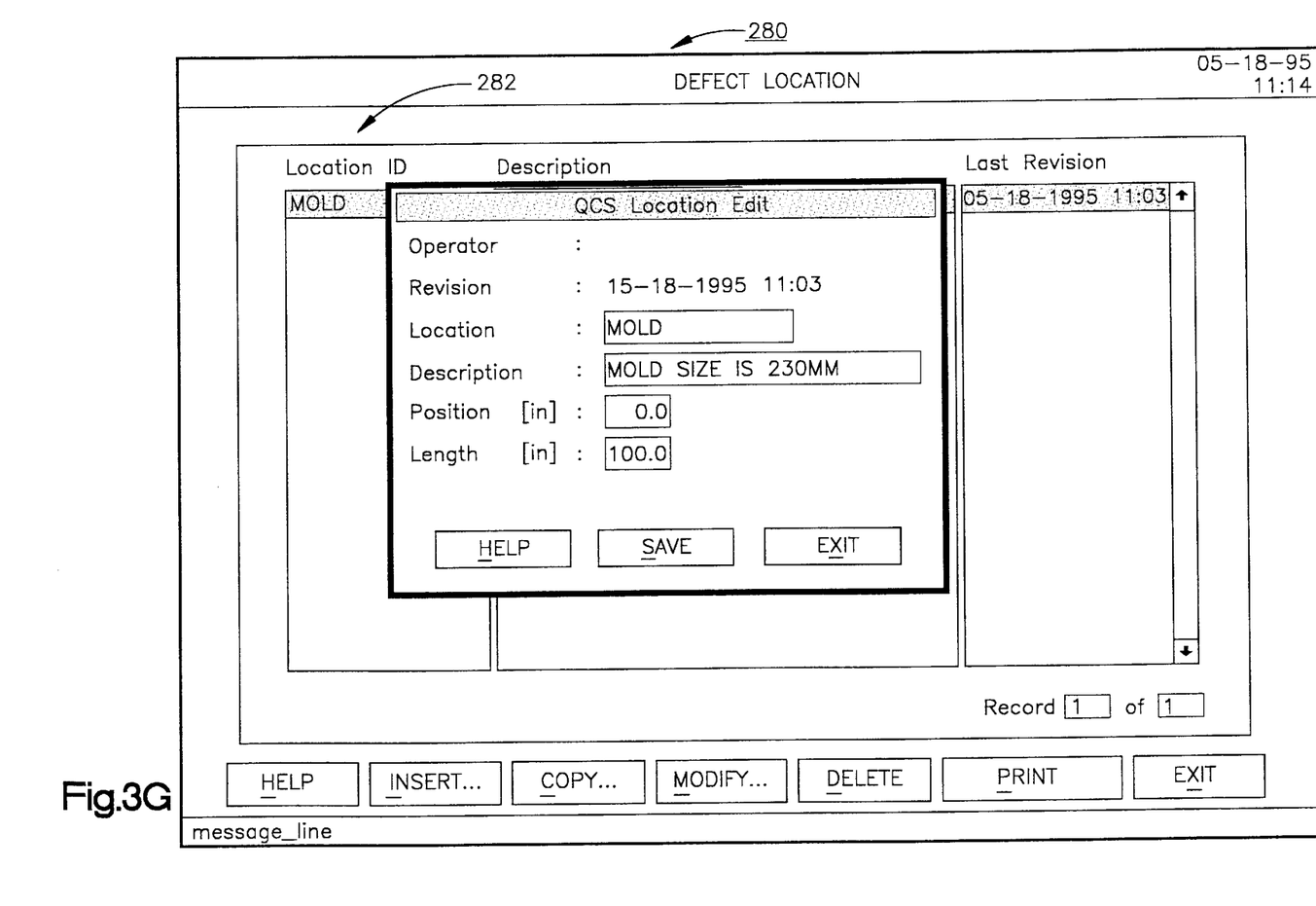
Figure 3H:
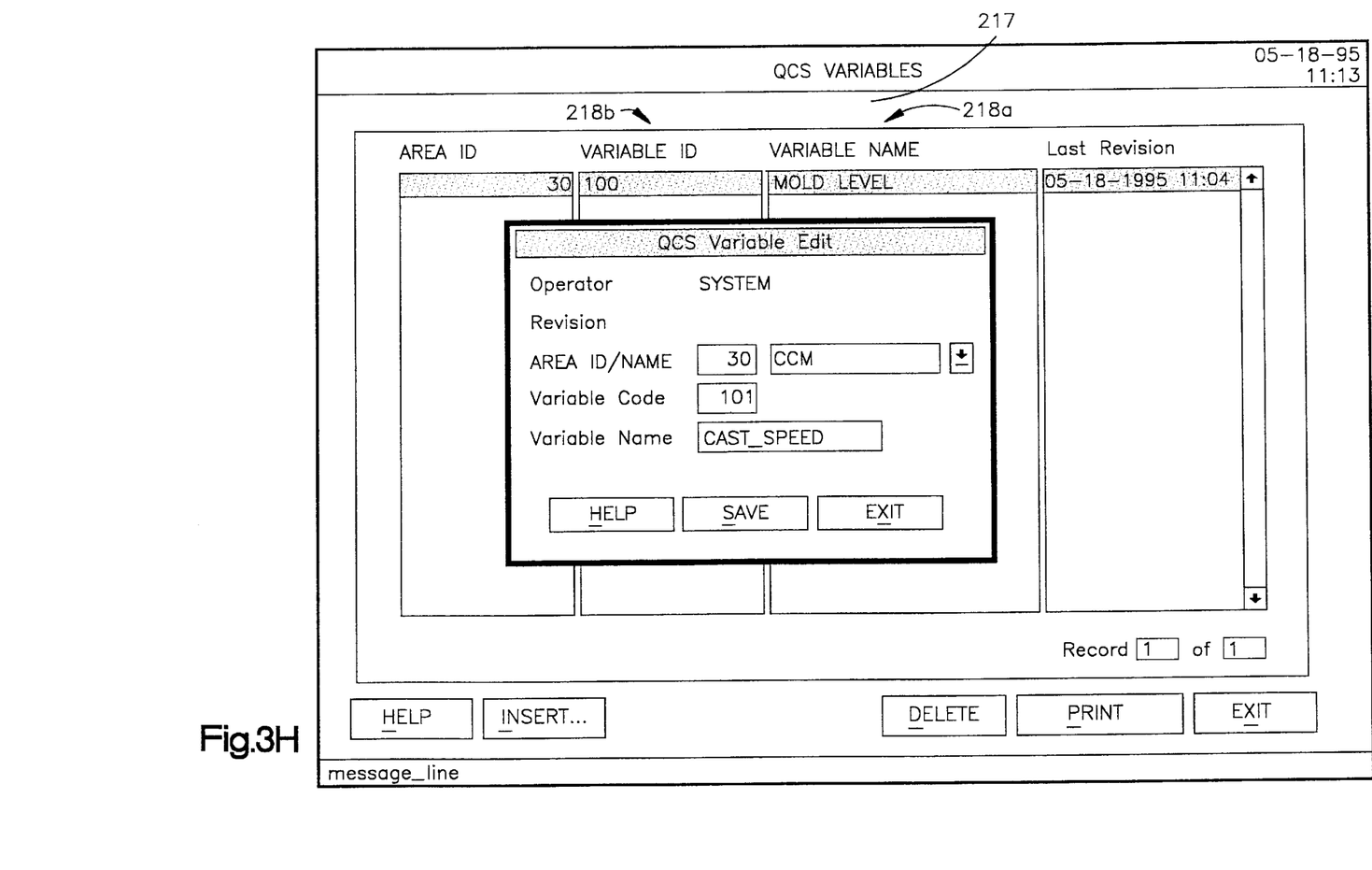

The full screen window 250 depicted in FIG. 3D opens in response to activation of either of the two buttons 244, 246. This screen 250 contains an edit box 252 having a scroll bar 253 that displays a string that defines the relation for QCS Code. Other edit boxes 254–256 define locations and influence regions that form non-key fields for the defect identified by the primary key QCSCode. Associated with the edit box 254 is a pull-down gadget 254a that lists location attributions from a table T6 shown in FIG. 5. A second defect variable entitled "HIGHMOLDLEVEL" based on table T3 is illustrated in FIG. 3D. The syntax of the relation in the edit box 252 is checked in response to activation of the button 258. The relation in the edit box 252 and the areas of influence are set up in response to activation of the save button 259. There is also an edit box 260 to choose a primary or main defect to be associated with the particular relation involving this QCS code. The edit box includes a pull down gadget 262 that allows the operator to choose from a number of pre-defined defects. An array 264 of secondary defects can also be associated with a particular QCS code.

The defects are maintained in a table T4 (FIG. 5) defined by operator activation of the buttons 214, 215 in FIG. 3A. Activating the button 214 opens a full screen window 270 containing a tabular listing 272 of defects. The listing 272 can be appended or modified by activating the buttons 274, 276 in the window 270. Activation of either of these two buttons opens a window 278 having edit boxes for updating defect descriptions. Similarly, the window 280 (FIG. 3G) allows the operator to define defect locations by maintaining a listing 282 of locations for the caster 10 that are stored in a format defied by the table T6.

The quality control system application program 200 executing on one of the computers performs a variety of functions as depicted in FIG. 4. Once the start of a cast of a heat is detected 302 by a sensor, the application program 200 reads metallurgical data from a metallurgical database 304 for that cast. Process variables are acquired 306 at periodic intervals and stored in a realtime database that can be accessed by the monitoring program 200. At periodic intervals (in accordance with a preferred embodiment of the invention every six seconds) the logical relations set up by the operator are evaluated by the mathematical parser. If a flag is set for a given relationship, defect data associated with that defect is stored in a production database 308 for the bloom then being cast.

The data stored in the production database 308 represents a quality array for each bloom. The quality array gives the operator and metallurgists information concerning the quality of the bloom and a list of defects based upon out of range sensed variables. A technological report is also created for each bloom. The application program 200 divides the length of each strand from the top of the mold 30 to the cut station 48 into small (about 100 mm) slices. While casting takes place the program 200 follows the strand and assigns real time process variables to the portion of the cast where the variables are applicable. When the bloom is cut 310, the defect data for a given bloom is stored in the technological report of the production database maintained by the Oracle software. A representative sampling of the over one hundred real time process variables organized in accordance with the table T1 is listed below:

| 1. Tundish Temperature | 2. Mold Level |
|---|---|
| 3. Tundish Level | 4. Mold Oscillation |
| 5. Mold Lubrication | 6. Mold Stirrer |
| 7. Mold Tempemture | 8. Bloom Temperature |
| 9. Roll Pressure | 10. Cast Speed |
| 11. Spray flow | 12. Spray Pressure |

The QCSElement table T3 forms a central role in the database management of defect identification and recordal. The Oracle command 'Create Table' defines the structure for this table. The fields are listed below:

```
QCS_ID      CHAR(16)   (Key field)
QCS_CODE CHAR(16)   (Key field)
EVALUATION_RELATION      CHAR(250)
ATTRIBUTION_ID CHAR(16)
ATTRIBUTION_POS     NUMBER(16,6)
ATTRIBUTION_LEN     NUMBER(16,6)
INFLUENCE_POSITIVE  NUMBER(16,6)
INFLUENCE_NEGATIVE  NUMBER(16,6)
QCS_DEFECT_ID   CHAR(3)
DEFECT_LEVEL   NUMBER(10,0)
OPERATOR CHAR(16)
CREATION DATE
REVISION DATE
QCS_DEFECT_ID_1     CHAR(4)
...
QCS_DEFECT_ID_15    CHAR(4)
```

The various other tables T1, T2, T4–T6 shown in FIG. 5 have similar fields used in storing multiple tuples of data. Further details concerning the building and organization of Oracle tables can be found in numerous texts. One such text is entitled "Oracle 7 A User's and Developer's Guide" by Sturner, Copyright 1995, International Thomson Publishing.

The present invention has been described with a degree of particularity. It is the intent that the invention include all modifications and alterations from the disclosed design falling within the spirit or scope of the appended claims.

We claim:

1. A method for monitoring a steel manufacturing process in real-time, the method comprising the steps of:

(a) displaying a user interface on a display to prompt an operator to define one or more groups of quality control events, wherein each group corresponds to one of a plurality of steel manufacturing processes;

(b) displaying a user interface on the display to prompt the operator to define for each group one or more quality control events by defining one or more logical relationships based on one or more of a plurality of steel manufacturing process variables;

(c) casting one or more strands of steel in accordance with one of the plurality of steel manufacturing processes by pouring molten steel into a mold of a continuous caster;

(d) sensing the process variables from the continuous caster as the one or more steel strands are cast;

(e) maintaining a process variable database of data representing the sensed process variables;

(f) determining whether any of the one or more logical relationships defined by the operator for the group corresponding to the one steel manufacturing process used for the casting step (c) have been satisfied based on the maintained data in the process variable database;

(g) determining one or more defects in one or more steel strands if one or more logical relationships have been satisfied as determined for the determining step (f);

(h) determining one or more segments of the one or more steel strands where the determined one or more defects are located; and (i) storing in a production database data representing the determined one or more defects and the determined one or more steel segments.

2. The method of claim 1, wherein the displaying step (b) comprises the step of prompting the operator to define the one or more logical relationships while the one or more steel strands are cast for the casting step (c).

3. The method of claim 1, wherein each steel manufacturing process corresponds to a grade of steel.

4. The method of claim 1, wherein the determining step (g) comprises the step of determining a severity of the determined one or more defects.

5. The method of claim 1, wherein the determining step (g) comprises the step of determining an influence range for the determined one or more defects.

6. The method of claim 1, comprising the step of:

displaying a user interface on the display to prompt the operator to record a defect of one or more steel strands as determined by the operator upon visual detection and storing data representing the visual defect in the production database.

7. The method of claim 1, wherein the displaying step (b) comprises the step of prompting the operator to define for each quality control event a defect location attribution.

8. The method of claim 1, wherein the displaying step (b) comprises the step of prompting the operator to define for each quality control event one or more defects corresponding to a logical relationship for the quality control event.

9. The method of claim 1, wherein each segment of the one or more steel strands is a bloom.

10. A system for monitoring a steel manufacturing process in real-time, the system comprising:

(a) a plurality of sensors for sensing a plurality of steel manufacturing process variables from a continuous caster as one or more steel strands are cast in accordance with one of a plurality of steel manufacturing processes;

(b) a process variable database for maintaining data representing the sensed process variables;

(c) a data network for communicating data from the plurality of sensors to the process variable database;

(d) a display;

(e) a production database; and (f) a logic processor for:
  (i) displaying a user interface on the display to prompt an operator to define one or more groups of quality control events, wherein each group corresponds to one of the plurality of steel manufacturing processes,
  (ii) displaying a user interface on the display to prompt the operator to define for each group one or more quality control events by defining one or more logical relationships based on one or more of the process variables,
  (iii) determining whether any of the one or more logical relationships defined by the operator for the group corresponding to the one steel manufacturing process used to cast the one or more steel strands have been satisfied based on the maintained data in the process variable database,
  (iv) determining one or more defects in one or more steel strands if one or more logical relationships have been satisfied as determined by the logic processor,
  (v) determining one or more segments of the one or more steel strands where the determined one or more defects are located, and
  (vi) storing in the production database data representing the determined one or more defects and the determined one or more steel segments.

11. The system of claim 10, wherein the logic processor prompts the operator to define the one or more logical relationships while the one or more steel strands are cast.

12. The system of claim 10, wherein each steel manufacturing process corresponds to a grade of steel.

13. The system of claim 10, wherein the logic processor determines a severity of the determined one or more defects.

14. The system of claim 10, wherein the logic processor determines an influence range for the determined one or more defects.

15. The system of claim 10, wherein the logic processor displays a user interface on the display to prompt the operator to record a defect of one or more steel strands as determined by the operator upon visual detection and stores data representing the visual defect in the production database.

16. The system of claim 10, wherein the logic processor prompts the operator to define for each quality control event a defect location attribution.

17. The system of claim 10, wherein the logic processor prompts the operator to define for each quality control event one or more defects corresponding to a logical relationship for the quality control event.

18. The system of claim 10, wherein each segment of the one or more steel strands is a bloom.

* * * * *